United States Patent [19]

Creighton et al.

[11] 4,109,074

[45] Aug. 22, 1978

[54] PROCESS FOR PREPARING A HYDROPHILIC WATER INSOLUBLE POLYMER AND THE RESULTING POLYMER AND POLYMER ARTICLES

[75] Inventors: Charles P. Creighton, Alden; Charles R. Teschemacher, Buffalo, both of N.Y.

[73] Assignee: Alden Optical Laboratories, Inc., Alden, N.Y.

[21] Appl. No.: 749,774

[22] Filed: Dec. 13, 1976

[51] Int. Cl.² .................... C08F 120/20; G02C 7/02; G02C 7/04
[52] U.S. Cl. .................... 526/320; 351/159; 351/160; 526/64; 526/77; 528/503
[58] Field of Search ............ 526/64, 320; 351/159, 351/160

[56] References Cited

U.S. PATENT DOCUMENTS

| | | | |
|---|---|---|---|
| 2,458,888 | 1/1949 | Rehberg | 526/320 |
| 3,503,942 | 3/1970 | Seiderman | 526/320 |
| 3,951,528 | 4/1976 | Leeds | 526/320 |
| 3,957,362 | 5/1976 | Mancini et al. | 526/320 |
| 3,963,685 | 6/1976 | Abrahams | 526/320 |
| 3,966,847 | 6/1976 | Seiderman | 526/320 |
| 3,983,083 | 9/1976 | Kaetsu et al. | 526/320 |
| 3,988,274 | 10/1976 | Masuhara et al. | 526/320 |
| 4,028,295 | 6/1977 | Loshaek | 526/320 |

*Primary Examiner*—Harry Wong, Jr.
*Attorney, Agent, or Firm*—Michael L. Dunn

[57] ABSTRACT

A process for preparing a hydrophilic water insoluble acrylic polymer by heating a composition consisting essentially of a compound having the generic formula

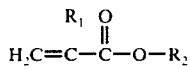

wherein —$R_1$ is —H, —$CH_3$, or —$CH_2CH_3$ and —$R_2$ is a lower alkyl radical containing at least one hydroxy group, said composition being essentially free from polymerization catalysts and initiators; the polymer resulting from the process and articles including contact lens blanks and contact lenses manufactured from the polymer.

1 Claim, No Drawings

PROCESS FOR PREPARING A HYDROPHILIC WATER INSOLUBLE POLYMER AND THE RESULTING POLYMER AND POLYMER ARTICLES

BACKGROUND OF THE INVENTION a. Field of the Invention

This invention relates to a novel cross-linked type of hydrophilic acrylic polymer. Such polymers are useful in physological applications and are particularly useful in manufacturing hydrophilic contact lenses.

b. History of the Prior Art

In the prior art, cross-linked hydrophilic acrylic polymers are known which were particularly suitable for applications wherein physiological contact with the body is desired. These prior art hydrophillic polymers however have several disadvantages. One disadvantage is that an initiator or catalyst, which is frequently a toxic compound, is required to initiate and control polymerization of the hydrophilic acrylic polymer. Purification of the polymer is then required to remove any remaining catalyst or initiator. In addition, prior art hydrophillic acrylic polymers are not sufficiently uniform to provide sufficiently predictable swelling and expansion when the polymer is exposed to an aqueous liquid.

While attempts were made in the prior art to form hydrophilic acrylic polymers suitable for physiological use without catalysts or initiators, such attempts were generally not satisfactory since they involved initiation with ultra-violet or gamma radiation which was not commercially practical. In addition, it was not recognized that a more uniform less toxic polymer structure would be obtained if catalysts and initiators were not used.

BRIEF DESCRIPTION OF THE INVENTION

In accordance with this invention, a process is provided for preparing a hydrophilic water insoluble acrylic polymer comprising heating a composition consisting essentially of a compound having the generic formula:

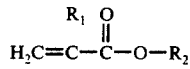

wherein $-R_1$ is $-H$, $-CH_3$, or $-CH_2CH_3$ and $-R_2$ is a lower alkyl radical containing at least one hydroxy group. The heating of the composition occurs at a temperature of from about 100° to about 165° C for from about 30 to about 360 minutes. The compound is essentially free from polymerization catalysts and initiators.

The invention additionally comprises the hydrophillic water insoluble acrylic polymer manufactured in accordance with the foregoing process and articles manufactured from the polymer. The invention further includes that embodiment wherein the article is a contact lens or contact lens blank.

DETAILED DESCRIPTION OF THE INVENTION

The hydrophilic polymer in accordance with the invention is prepared by heating its purified monomer to a temperature of from about 100° to about 165° C for from about 30 to about 360 minutes. About 100° C is near the lower limit to which the monomer is heated in accordance with the invention. When lower temperatures are used, polymerization proceeds at an unacceptably slow rate or it does not occur at all. A more desirable lower limit in order to obtain an increased reaction rate is about 110° C and an even more desirable lower limit in order to obtain a further increase in reaction rate is about 120° C. In general, temperatures in excess of 165° C are not used in the process of the invention since a further increase in temperature makes control of the reaction more difficult. In addition, high reaction temperatures tend to provide less predictable results due to partial decomposition. A more desirable upper limit for the reaction temperature is 130° C and an upper limit of 120° C is most preferable. The reaction time as previously indicated, is from about 30 to about 360 minutes. The reaction time is dependent upon reaction temperature and reduced reaction times are obtained at higher reaction temperatures. At a reaction temperature of from about 110° to 130° C, suitable reaction times are between about 60 to about 300 minutes. At a reaction temperature of from about 120° to 130° C, the most desirable reaction times are usually from about 90 to about 120 minutes and at a reaction temperature of from about 110° to 120° C, the most desirable reaction times are usually from about 120 to about 240 minutes.

The monomer for use in accordance with the process of the invention has the generic formula

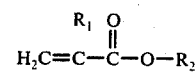

wherein $-R_1$ is $-H$, $-CH_3$ or $-CH_2CH_3$ and $-R_2$ is a lower alkyl radical containing at least one hydroxy group. Lower alkyl, as used herein means an alkyl radical containing two through four carbon atoms. Examples of such hydroxy containing lower alkyl radicals are radicals of ethanol and glycerol.

The most desirable monomer for use in accordance with the process of the invention is ethylene glycol monomethacrylate which is essentially free from polymerization catalysts and initiators. In addition, it is most desirable that the ethylene glycol monomethacrylate contain less than 0.05 weight percent of ethylene glycol dimethacrylate. Ethylene glycol dimethacrylate is a cross-linking agent which assists in obtaining a cross-linked hydrophilic acrylic polymer thus creating water insolubility. While prior art methods require that certain amounts of ethylene glycol dimethacrylate be present in the ethylene glycol monomethacrylate, it has been found in accordance with this invention that ethylene glycol dimethacrylate is desirably absent since a polymer having more predictable properties is obtained. If any ethylene glycol dimethacrylate is present, it is most desirably created from ethylene glycol monomethacrylate during the reaction.

Other suitable monomer compositions for use in accordance with the invention are ethylene glycol monoethacryate, propylene glycol monoacrylate, propylene glycol monomethacrylate, propylene glycol monoethacrylate, glycerol monomethacrylate and glycerol monoacrylate.

It has further been found that a more predictable polymer and a polymer having more desirable physical properties will be obtained if the monomer is heated in a metallic container which is desirably aluminum. When a small article, such as a contact lens or contact lens blank is to be manufactured from the polymer, the container is desirably a tube having an inside diameter of from about 0.05 to about 2 centimeters and a wall thickness of from about 0.1 to about 1.5 millimeters.

The polymer which results from the process of the invention has more desirable physical properties than were previously obtainable in the prior art. The resulting polymer has more predictable and more uniform expansion when it is contacted with an aqueous system and does not require further purification or treatment to remove undersirable by-products or catalyst and initiator residue. The reason for the more uniform and predictable expansion rate for the polymer in water when compared to similar prior art polymers is not clearly understood with respect to any change in the structure of the polymer manufactured in the process of the invention. It is however, apparent that the polymers differ in some way which can not be presently defined.

It is also further apparent that the process of the invention is simpler than prior art processes because use of a catalyst is avoided and because the undesirable process step of carefully weighing and incorporating catalysts is avoided. In addition, as previously discussed, additional purification steps to remove residual catalyst are no longer needed.

It was not previously possible to heat cure an acrylic hydrophilic monomer. It has however been unexpectedly discovered than when ethylene glycol dimethacrylate is removed from the monomer, predictable and excellent hydrophilic water insoluble acrylate polymers are obtained. Ethylene glycol dimethacrylate was always present in the prior art monomer since it was thought by those skilled in the art that the presence of an alkylene glycol diacrylate or alkylene glycol dimethacrylate was essential to obtaining a satisfactory result.

In accordance with the present invention, the monomer, which is used, is obtained by extracting commercial alkylene glycol monoalkyl acrylate or alkylene glycol monoacrylate with an extraction solvent to remove any alkylene glycol dialkylacrylate or alkylene glycol diacrylate from the monomer.

This process is particularly suitable for removing ethylene glycol dimethacrylate from ethylene glycol monomethacrylate monomer. In the extraction process, a mixture of a water insoluble extraction solvent and water is used to extract the diacrylates from the monoacrylates. After extraction, residual solvent, water and other minor impurities remaining in the monoacrylates are removed by vacuum distillation at a temperature of between about 60° to 80° C. At these low temperatures, little polymerization effect is noted. The resulting monoacrylate polymers are then used in the process of the invention.

EXAMPLES

The following examples serve to illustrate the process of the invention and the resulting polymer and polymer articles. The examples are in the manner of illustration only and are not to be considered limitations upon the scope of the invention as claimed.

EXAMPLE 1

1,400 milliliters of commercial ethylene glycol monomethacrylate containing a small percentage of ethylene glycol dimethacrylate is extracted in three separate fractions of 500, 500 and 400 milliliters with a mixture of hexane and water. The hexane fraction is decanted and the water containing fraction is vacuum distilled to remove water and residual hexane. The water containing fraction is placed in a distilling flask which is heated with a water bath at a temperature of between about 60° and 80° C. A small vacuum pump with an automonitor is used to create the vacuum in the flask. Hexane and water is collected at a vapor temperature of from 23° C to 44° C and distillation is stopped at a vapor temperature of 44° C. The resulting ethylene glycol monomethacrylate residue is analyzed by gas chromatography and found to contain less than 0.05 weight percent of ethylene glycol dimethacrylate.

EXAMPLE 2

40 milliliters of ethylene glycol monomethacrylate purified in accordance with Example 1, is placed in a 50 milliliter aluminum dish which is covered. The aluminum dish is placed in a oven at 100° C for a period of 6 hours. The resulting product is polymerized but is found to be soft and slightly sticky around the edge.

EXAMPLE 3

The procedure of Example 2 is followed except the dish is heated at a temperature of 110° C for a period of 4 hours. The resulting product is found to be completely polymerized and is a hydrophilic water insoluble polymer having good optical properties.

EXAMPLE 4

The procedure of Example 3 is followed except the dish is heated at a temperature of 115° C for a period of 2 hours. Again, the resulting product is a completely polymerized ethylene glycol monomethacrylate which is hydrophilic and water insoluble. Again, the product has good optical properties.

EXAMPLE 5

The procedure of Example 4 is followed except the dish is heated at a temperature of 130° C for 2 hours. The resulting product is a hydrophilic polymer having good optical properties and is water insoluble.

EXAMPLE 6

20 milliliters of ethylene glycol monomethacrylate purified in accordance with the Example 1 is placed in a 25 milliliter aluminum tube having a diameter of about 2 centimeters. The tube is then placed in an oven at 110° C for 4 hours. The resulting product is found to be a clear hydrophilic water insoluble polymer.

EXAMPLE 7

The polymer prepared in accordance with Example 2-6 are cut into buttons. The buttons are then annealed at a temperature of 135° C for 2 hours and cooled slowly. The buttons are then manufactured into contact lens blanks by machining. Upon exposing the blanks to water, they expand with a reproducible uniformity and amount to form high quality contact lenses.

What is claimed is:

1. A contact lens or contact lens blank manufactured from a hydrophilic water insoluble water expandable acrylic polymer; said polymer being prepared by a process consisting essentially of heating a composition consisting essentially of ethylene glycol monomethacrylate; said composition being heated to a temperature of from about 100° to about 165° C for from about 30 to about 360 minutes and annealed at a temperature of about 135° C for about 2 hours, said composition being essentially free from polymerization catalysts and initiators and said composition containing less than about 0.05 weight percent ethylene glycol dimethacrylate.

* * * * *